March 5, 1935.  A. E. ENGLEBRIGHT  1,993,366
PIPE LAYING APPARATUS
Filed Dec. 28, 1931   2 Sheets-Sheet 1
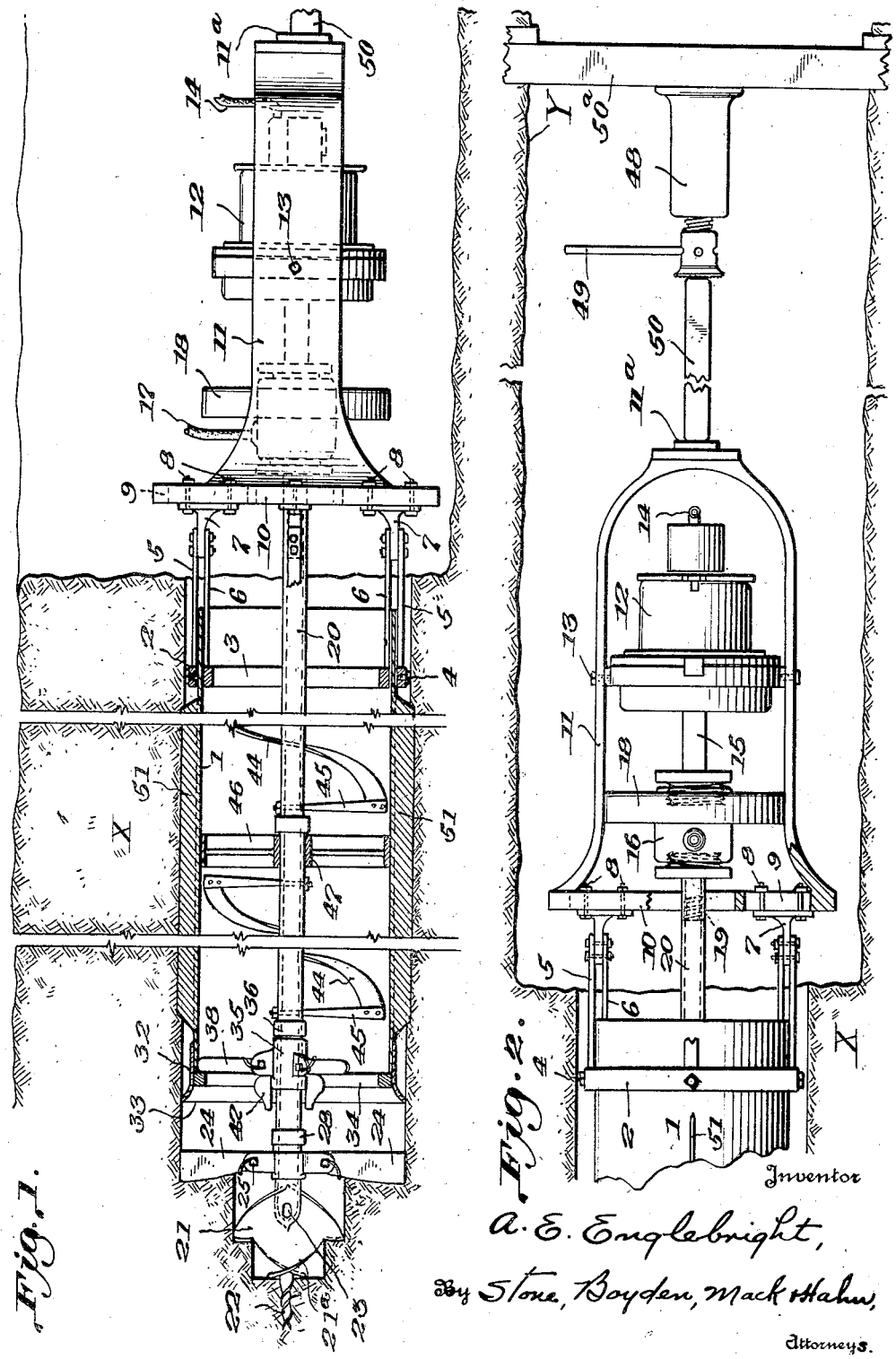

March 5, 1935.  A. E. ENGLEBRIGHT  1,993,366
PIPE LAYING APPARATUS
Filed Dec. 28, 1931   2 Sheets-Sheet 2
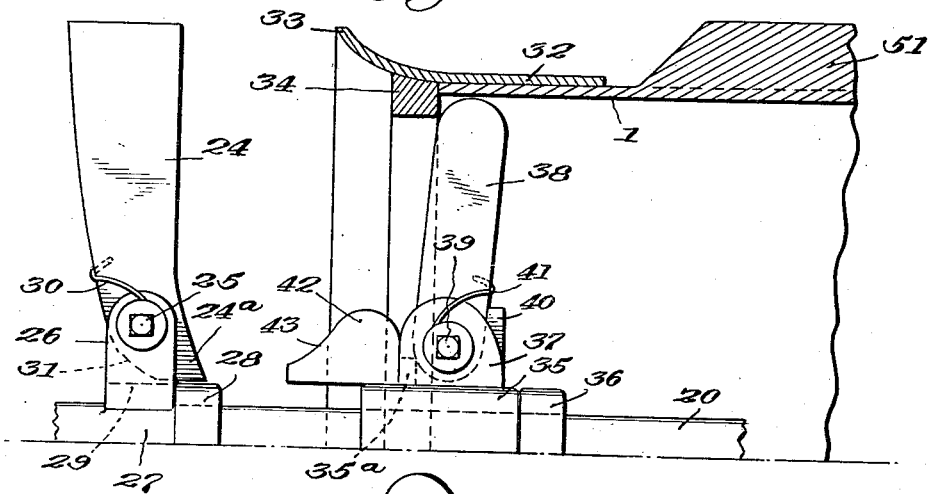
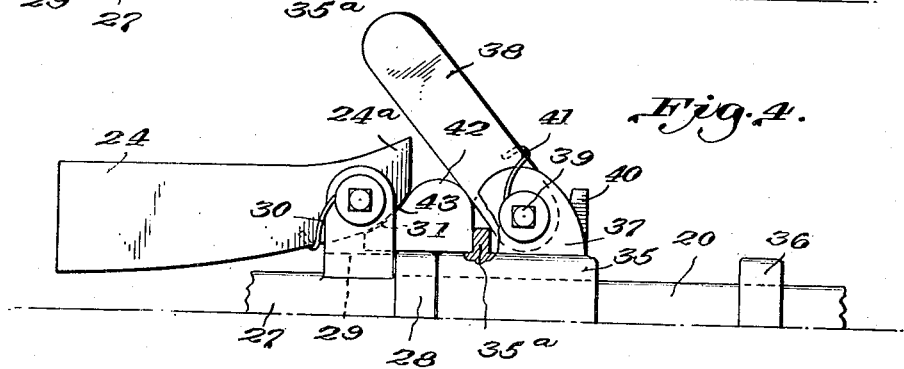
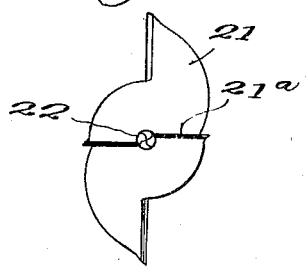
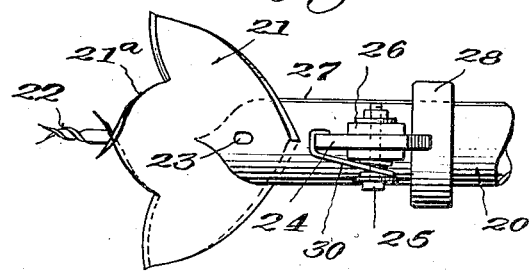
A. E. Englebright, Inventor
By Stowe, Boyden, Mack & Hahn,
Attorneys Patented Mar. 5, 1935

1,993,366

UNITED STATES PATENT OFFICE 1,993,366

PIPE LAYING APPARATUS

Alfred E. Englebright, San Rafael, Calif., assignor to Hydrauger Corporation, Ltd., San Francisco, Calif., a corporation of California Application December 28, 1931, Serial No. 583,593

19 Claims. (Cl. 255—20)

This invention relates to apparatus for laying pipes or culverts in the ground, and more particularly to apparatus comprising in combination means for boring holes horizontally through the earth and inserting pipes in the holes so bored. The invention has special utility in connection with the laying of pipes, conduits or culverts under railway embankments, highways, street intersections and the like.

It has heretofore been proposed to provide apparatus of this general character in which a movable carriage, to which the motor for driving the boring device and one end of the pipe to be laid are secured, is arranged to travel along a trackway. Such apparatus is more or less expensive to construct and is somewhat limited as regards locations in which it can be operated.

One of the objects of the present invention is to provide apparatus in which no trackway is required, but in which the motor for operating the boring device is mounted directly upon the end of the pipe itself.

In the boring of long holes through different kinds of material it frequently happens that the boring cutter becomes dull or broken, so that it is necessary to either repair or renew the same. Inasmuch as this cutter is necessarily of larger diameter than the pipe being laid, it has heretofore been impossible to withdraw the cutter through the pipe, or to insert a new cutter in position. This fact has proven a serious drawback to the practical use of pipe laying apparatus of this character.

Regardless of whether or not a travelling carriage and track are employed, another object of the present invention is therefore to provide a boring cutter so constructed that it may be readily inserted or withdrawn through the pipe being laid, so that it may be repaired or renewed if necessary during the operation of laying the pipe. To this end, I have devised a boring cutter having collapsible parts which permit its free passage through the pipe.

In order to support and center the boring bar within the pipe, it is necessary to provide a centering guide in which the bar is journalled and which normally engages the interior of the pipe. If, however, as above described, the cutter is made collapsible so that it can be withdrawn from or inserted in the pipe, it is desirable that a centering guide be provided which can likewise be withdrawn or inserted. Still another object of the invention, therefore, is to devise a centering guide so constructed that it can fold or collapse to a diameter less than that of the pipe, whereby it can readily pass through the pipe.

A still further object of the invention is to provide improved means whereby the boring cutter and centering guide are both automatically restored to expanded operative position when they reach the forward end of the pipe, after having been inserted through the pipe in collapsed condition.

Additional and subsidiary objects of the invention will appear as the description proceeds.

In order that the invention may be readily understood, reference is had to the accompanying drawings forming part of this specification, and in which:

Fig. 1 is a sectional side elevation of my improved earth boring and pipe laying apparatus, parts being broken away and parts omitted for the sake of clearness;

Fig. 2 is a plan view of the rear end of such apparatus, parts being broken away and parts shown in section;

Fig. 3 is a fragmentary side elevation on an enlarged scale showing my improved boring cutter and centering guide in their expanded or operative position, parts being broken away and parts shown in section;

Fig. 4 is a similar view showing the boring cutter and centering guide in folded or collapsed position;

Fig. 5 is an end view of the improved drill bit which I preferably employ; and

Fig. 6 is a side elevation thereof, showing also one of my improved foldable cutter blades in end elevation.

Referring to the drawings in detail, 1 designates the pipe to be laid. This may be of any desired size within the limits of the apparatus, and either plain or corrugated.

Embracing the pipe adjacent its rear end is a clamping collar 2, and registering with this collar on the inside of the pipe is a similar clamping ring 3, the pipe being confined between this collar and ring and clamped thereto by means of set screws 4. Extending rearwardly from the collar and ring 2 and 3 are a plurality of pairs of thrust arms or bars 5 and 6. These are secured at their rear ends to brackets 7 which in turn are adjustably mounted upon the face of a disk shaped working head 10 by means of bolts 8 passing through slots 9 in such heads (see Fig. 2).

Rigidly secured to and extending rearwardly from the head 10 is a U-shaped yoke 11, the head 10 and yoke 11 together constituting a rigid frame.

Between the sides of this frame is mounted a suitable motor 12, being secured to the frame by means of bolts 13. In the present case, this motor is illustrated as being of the compressed air type, supplied with motive fluid by means of a flexible hose 14. It will, however, be understood that an electric, gasoline, or other type of motor may be employed without departing from the spirit of the invention.

Extending forwardly from the motor 12 is a power shaft 15 which passes through a hydraulic head 16 supplied with water through a hose 17 and supported and centered in the frame by means of a ring or spider 18, this hydraulic head and supporting ring being substantially similar to that shown in the copending application, Serial No. 469,906, filed by myself, Frederick J. Foret and James E. C. Currens, July 22, 1930. The function of this hydraulic head is the same as in said prior application, namely, to supply water to the interior of the hollow boring bar which in turn delivers it to the drill bit.

The forward end of the power shaft 15 adjacent the hydraulic head 16 is provided with the usual threaded coupling 19 to which the boring bar 20 is attached. This boring bar, as in said prior application, is made up of a plurality of sections the distance between the joints of which is substantially equal to the length of the pipe sections being laid, so that when a new section of pipe is placed in position a new section of boring bar may be similarly inserted.

To the forward end of the boring bar is secured a suitable auger or bit comprising a large diameter portion 21, an intermediate portion 21ª, and a pilot 22. The port through which water is discharged from the boring bar is shown at 23, and it will be noted that this is at the rear end of the auger bit. Thus the water serves to carry away the cuttings, while permitting the pilot to remain dry.

In addition to the auger bit and adjacent thereto, I provide a pair of cutter blades 24 disposed radially of the boring bar and 180° apart. These cutter blades are pivoted on bolts 25 to brackets 26 so as to swing in the plane of the boring bar from the full radial operative position shown in Figs. 1 and 3 to the folded or inoperative position shown in Fig. 4. The brackets 26 are carried by a central or hub portion 27 at the rear end of which is provided an annular ring or shoulder 28 which separates the hub 27 from the rest of the boring bar 20 and in which there may be a screw threaded joint.

As clearly shown in the drawings, each arm 24 is mounted between bifurcated portions of the brackets 26, such brackets being cut away inwardly of the pivot pins 25 to some such extent as indicated by the dotted line 29 in Figs. 3 and 4.

A spring 30 of resilient wire or the like is wound about the pivot bolt 25 and has its free end engaging the forward edge of the blade 24, as clearly shown in the drawings, so that this spring normally tends to rotate the blade about its pivot in a clockwise direction into the operative position shown in Fig. 3. Each blade is provided, inwardly of the pivot 25, with a rearwardly extending foot 24ª, which, when the blade is in the operative position shown in Fig. 3, engages the surface 29 of the bracket 26, or the ring 28, and thus constitutes a stop to limit the swinging movement of the blade about its pivot and prevent it going beyond the true radial operative position.

In order to provide a clearance between the pipe or culvert and the walls of the hole into which it is being inserted, I preferably place upon the forward end of the pipe a leader ring 32 having a flaring bell shaped edge 33 of considerably larger diameter than the pipe. As clearly shown in Fig. 1, this produces a space or clearance between the pipe 1 and the walls of the hole X and renders the insertion of the pipe easier. Inside of this leader ring, I secure an annular abutment ring or shoulder 34, as best shown in Fig. 3, the inside diameter of this ring being somewhat less than the inner diameter of the pipe.

Mounted to move freely on the boring bar 20 between the shoulder 28 and a fixed ring 36 suitably spaced therefrom is a sleeve 35 having a plurality of brackets 37 extending radially therefrom. Three such brackets are contemplated and have proven satisfactory.

Pivotally mounted in each bracket is a radially extending leg or finger 38 of such a length that the 3 legs or fingers when in expanded position snugly contact with the inner surface of the pipe. The hub or sleeve 35 and the legs 38 thus constitute a centering guide for the bar 20 which, as will be readily understood, is journalled in the sleeve 35.

Each leg 38 is pivotally mounted on a bolt 39 to swing in the plane of the bar 20 and at the rear of each bracket 37 is disposed a stop 40 adapted to engage the leg and limit the rearward movement thereof. Also, a spring 41 is associated with each leg, such spring being wound about the bolt 39 and having its free end engaging the rear edge of the leg so that it tends to swing the leg forwardly, as shown in Fig. 4. A rib 35ª, carried by the sleeve 35, serves as a stop to limit such forward swinging movement.

Also carried by the sleeve 35 and projecting forwardly therefrom are a pair of blocks 42, spaced 180° apart. Each of these blocks has on its outer edge a cam or ogee portion 43 so shaped as to substantially conform with and engage under a cam surface 31 formed on the inner end of the cutter blade 24, adjacent the foot 24ª, so that when these blades are folded down into a position parallel with the boring bar and the projections 43 are inserted under the cam surfaces 31, as shown in Fig. 4, the cutter blades are locked in such folded position.

From the foregoing, it will be seen that when it is desired to insert the cutter blades and centering guide into the rear end of the pipe, they are first placed in folded position, as shown in Fig. 4, and they may then be freely pushed through the pipe to the forward end thereof. When the forward end is reached, the ends of the legs 38 engage the ring 34, which arrests the movement thereof. Then, as the boring bar is pushed forward still further, the legs 38 of the centering guide are swung rearwardly over center about their pivots and fully expanded into the braced or locked position shown in Fig. 3. At the same time, the hub 27 carrying the cutter blades moves away from the sleeve 35 of the centering guide, and the locking members 43 are thus withdrawn from engagement with the cutter blades and the springs throw these blades open to full radial or operative position, as shown in Fig. 3. Thus automatic means are provided for expanding and restoring to operative position both the centering guide and the cutter blades when the proper position in the pipe is reached.

In connection with the above, it will be noted that, after the hub 27 moves away from the forward end of the sleeve 35, as described, the ring 36, fixed to the boring bar 20, engages the rear end thereof. The thrust of this ring is transmitted through the legs 38 to the ring 34, and thus these elements share with the clamping rings 2 and 3 the burden of forcing the bell 32 and pipe 1 forwardly.

When it is desired to withdraw the boring assembly from the pipe, for inspection or repair, it will be seen that, upon rearward movement of the boring bar, the cutter blades 24 will yield and bend forwardly, so that they may be dragged back through the pipe, and after the ring 28 has engaged the sleeve 35, and has moved the legs 36 away from the ring 34, these legs will swing over center, due to friction against the pipe, and the springs 41 will then tend to hold them in collapsed position, as shown in Fig. 4.

As in the above identified prior copending application, I contemplate employing helical conveyer sections around the boring bar, such conveyer sections operating inside of the pipe and serving to force the excavated material rearwardly. In Fig. 1, two such conveyer sections are indicated at 44 and are shown as supported on radial spokes 45.

Where the boring bar is of considerable length, it will be appreciated that there is a decided tendency for it to sag, and this causes the conveyer sections to bear upon and drag against the lower inner surface of the pipe. I find that a great deal of this frictional load can be obviated by the provision of one or more supporting devices disposed between the conveyer sections and serving to sustain their weight. One of these supporting devices is shown in Fig. 1 and is illustrated as a ring or spider 46 having a central hub 47 which is preferably loosely mounted on the boring bar 20. Since it is desirable that these supporting rings be capable of passing freely through the pipe when the collapsible cutter is withdrawn or inserted, as described herein, I prefer to make them of slightly smaller diameter than the internal diameter of the pipe.

Furthermore, when the boring bar, with the cutter blades 24 and centering legs 38 in collapsed or folded position, is being inserted as described, it is sufficiently centered and guided by these helical conveyer sections and spiders, so that the legs strike nothing which would tend to open them until the stop ring 34 is reached.

From the foregoing, it will be understood that the boring bit or cutter is operated by the motor 12 by means of the boring bar 20 which extends through the pipe, and that as the hole is bored and the excavated material carried rearwardly through the pipe, the entire apparatus, including the pipe, is pushed forwardly into the hole. This forward feeding of the apparatus may be accomplished in a number of different ways. Thus, in said prior application, a track and carriage, and rack and pinion mechanism was provided for pushing the pipe along. As was mentioned, however, it is not necessary to employ a travelling carriage, and the apparatus shown in the present drawings may be pushed forward by means of any suitable jack either engaging a ratchet rail or the like or having a bearing against the wall of the embankment.

As illustrated in Fig. 2, I have shown a jack 48 of any usual or desired construction, having an operating handle 49 and exerting its thrust through a pusher bar 50 against a bearing plate 11ᵃ or the like at the rear end of the U-shaped yoke or frame 11. The thrust of the jack may be taken by timbers 50ᵃ set into the walls Y of the excavation, or by any other suitable means.

It will be understood that after the pipe has been inserted in the hole to the extent of the length of one section, the clamping rings 2 and 3 are released, the frame 11 and associated parts moved rearwardly and a new section of pipe and of boring bar inserted between the frame and the sections already in place. The boring and jacking forward is then repeated.

It is found in practice that it is impossible to secure exact accord between the length of pipe sections and the length of boring bar sections, and for this reason it is necessary to provide for an adjustable connection between the motor frame and the pipe being inserted. This is afforded by means of my improved clamping rings 2 and 3 and spaced thrust arms 5 and 6, above described. After the boring bar sections have been inserted and coupled up to the power shaft 15, the clamping rings 2 and 3 can be adjusted longitudinally of the pipe until the thrust arms can be bolted to the working head, as described. Then the set screws 4 are tightened and the apparatus is ready to operate. I, therefore, regard this longitudinally adjustable clamping collar or ring as an important practical feature of the invention.

Since the motor is carried directly and solely by the pipe itself, the torque reaction tends to make the pipe rotate. Usually the mere friction of the pipe against the walls of the hole will be sufficient to hold it against rotation, but in some cases I may apply one or more radial longitudinally extending ribs or fins to the surface of the pipe, as indicated at 51. These may be welded to the pipe or otherwise secured thereto.

What I claim is:

1. Combined earth boring and pipe laying apparatus, comprising a pipe to be laid, a rotary earth boring device operating through said pipe, a motor wholly outside of said pipe for driving said device, a frame to which said motor is secured, and means for rigidly connecting said frame to the end of said pipe, whereby the friction of said pipe in the earth tends to sustain the reaction due to the torque exerted by said motor.

2. Combined earth boring and pipe laying apparatus, comprising a pipe to be laid, a rotary earth boring device operating through said pipe, a motor for driving said device, a frame to which said motor is secured, and means adjustable longitudinally of said pipe for rigidly supporting said frame on the pipe, whereby said pipe tends to sustain the reaction due to the torque of the motor.

3. Combined earth boring and pipe laying apparatus, comprising a pipe to be laid, a rotary earth boring device operating through said pipe, a motor for driving said device, a frame to which said motor is secured, a clamping device encircling said pipe and capable of entering the bore made by said boring device, thrust arms extending rearwardly from said clamping device and rigidly connecting the same with said frame, and means for pushing said frame forwardly.

4. Pipe laying apparatus comprising a pipe to be laid, a rotary earth boring device operating through said pipe, a motor entirely outside of said pipe for driving said device and means for supporting said motor wholly on said pipe.

5. Pipe laying apparatus comprising a pipe to be laid, a rotary earth boring device operating through said pipe, a motor outside of said pipe for driving said device and means for at least partially supporting said motor on said pipe.

6. Pipe laying apparatus comprising a pipe to be laid, a rotary earth boring device operating through said pipe, a frame, a motor carried on said frame and adapted to drive said boring device, a clamping collar capable of entering the bore made by said device surrounding said pipe and adjustable longitudinally thereof, and rigid members connecting said collar with said frame.

7. Earth boring apparatus comprising a boring bar, radially disposed cutter blades pivotally mounted on said bar to swing substantially in the plane of the axis thereof from a folded position to cutting position substantially at right angles thereto, a spring urging the blades toward cutting position, and means for arresting the swinging movement when said blades reach such cutting position.

8. Earth boring apparatus comprising a boring bar, radially disposed cutter blades pivotally mounted on said bar on pivots spaced therefrom to swing in the plane thereof from cutting position to a folded position substantially parallel with said bar, and means slidable on said bar for locking said blades in folded position.

9. Earth boring apparatus comprising a boring bar, radially disposed cutter blades pivotally mounted on said bar to swing in the plane thereof from cutting position in which they extend substantially at right angles to said bar, to folded position in which they extend along and substantially parallel with said bar and wholly outside thereof, means for locking said blades in folded position, and means operted by longitudinal movement of said boring bar for releasing said locking means.

10. Combined earth boring and pipe laying apparatus comprising a pipe to be laid, a boring cutter of larger diameter than the pipe operating at the forward end of said pipe, a boring bar carrying said cutter and extending through said pipe, said cutter having parts foldable to a diameter smaller than the pipe, and means independent of the pipe for locking such parts in folded position, whereby said cutter may be inserted at the rear end of said pipe and pushed through the same to the forward end thereof.

11. Combined earth boring and pipe laying apparatus comprising a pipe to be laid, a boring cutter of larger diameter than the pipe operating at the forward end of said pipe, a boring bar carrying said cutter and extending through said pipe, said cutter having parts foldable to a diameter smaller than the pipe, means independent of the pipe for locking said parts in folded position, whereby said cutter, while in such condition, may be inserted at the rear end of said pipe and pushed through the same to the forward end thereof, and means for automatically releasing said locking means when the forward end of the pipe is reached and for restoring said folded parts to normal cutting position.

12. Combined earth boring and pipe laying apparatus comprising a pipe to be laid, a boring cutter operating at the forward end thereof, a rotary boring bar carrying said cutter and extending rearwardly through said pipe, and a centering guide in which said bar is journaled, said guide normally engaging the interior of the pipe and being collapsible so as to permit its insertion and withdrawal through said pipe.

13. Combined earth boring and pipe laying apparatus comprising a pipe to be laid, a boring cutter operating at the forward end thereof, a rotary boring bar carrying said cutter and extending rearwardly through said pipe, and a centering guide in which said bar is journaled, said guide comprising a plurality of radially disposed legs adapted to engage the interior of the pipe and pivoted to swing in the plane of said bar, whereby, when swung inwardly toward said bar, they may pass freely through said pipe.

14. Combined earth boring and pipe laying apparatus comprising a pipe to be laid, a boring cutter operating at the forward end thereof, a rotary boring bar carrying said cutter and extending rearwardly through said pipe, a centering guide in which said bar is journaled, said guide normally engaging the interior of the pipe during operation of the cutter and being collapsible so as to permit its passage therethrough, and means at a certain point in said pipe for automatically expanding said guide to normal condition when said point is reached as said guide, in collapsed condition, is being inserted into the pipe.

15. Combined earth boring and pipe laying apparatus comprising a pipe to be laid, a boring cutter of larger diameter than the pipe operating at the forward end of said pipe, a rotary boring bar carrying said cutter and extending through the pipe, and a centering guide on said bar normally engaging the interior of the pipe, both said cutter and centering guide having pivotally mounted collapsible parts whereby they may be inserted or withdrawn through said pipe with said bar.

16. Combined earth boring and pipe laying apparatus comprising a pipe to be laid, a boring cutter of larger diameter than the pipe operating at the forward end of said pipe, a boring bar carrying said cutter and extending through the pipe, a centering guide on said bar normally engaging the interior of said pipe, both said cutter and centering guide having collapsible parts whereby they may be inserted through said pipe when in collapsed condition, means for locking the parts of the cutter in collapsed position, a spring tending to move the cutter parts to operative expanded position when said locking means is released, and means for automatically expanding said centering guide to normal condition and releasing said locking means when said guide and cutter reach the proper point as they are being inserted through the pipe.

17. Combined horizontal earth boring and pipe laying apparatus comprising a pipe to be laid, a boring cutter operating at the forward end thereof, a rotary boring bar carrying said cutter and extending rearwardly through said pipe, a plurality of helical conveyer sections surrounding said boring bar and operating within said pipe, and a supporting device for said bar mounted on the bar at a point intermediate the ends thereof between two conveyer sections, said supporting device being unattached to but adapted to rest upon the interior surface of the pipe to sustain the weight of the conveyer sections, but being of somewhat smaller diameter than said pipe, whereby it may freely pass through the pipe as the boring bar, carrying the conveyer sections and said supporting device, is inserted or withdrawn.

18. Combined earth boring and pipe laying apparatus comprising a pipe to be laid, a boring cutter operating at the forward end thereof, a rotary boring bar carrying said cutter and extending rearwardly through said pipe, a centering guide in which said bar is journaled, said guide normally engaging the interior of the pipe during operation of the cutter and being collapsible so as to permit its passage therethrough, and a stop carried by said pipe for automatically expanding said guide to normal condition when, as said guide, being inserted into the pipe in collapsed condition, reaches and engages said stop.

19. Earth boring apparatus comprising a boring bar, radially disposed cutter blades pivotally mounted on said bar to swing in the plane thereof from cutting position in which they extend substantially at right angles to said bar, to folded position in which they extend alongside of and substantially parallel with said bar, and means movably mounted on the outside of said bar and engaging the inner side of the blades at the rear of the pivot for locking said blades in folded position.

ALFRED E. ENGLEBRIGHT.